United States Patent [19]

Simmons

[11] 4,335,797
[45] Jun. 22, 1982

[54] NOISE SUPPRESSION ARRANGEMENT FOR ENGINE ENCLOSURES

[75] Inventor: Gerald P. Simmons, Washington, Ill.

[73] Assignee: Caterpillar Tractor Co., Peoria, Ill.

[21] Appl. No.: 95,194

[22] PCT Filed: Oct. 10, 1979

[86] PCT No.: PCT/US79/00836
§ 371 Date: Oct. 10, 1979
§ 102(e) Date: Oct. 10, 1979

[87] PCT Pub. No.: WO81/01069
PCT Pub. Date: Apr. 16, 1981

[51] Int. Cl.³ .................. B62D 25/10; F01N 7/00; G10K 11/16
[52] U.S. Cl. .................. 180/69 R; 52/473; 98/121 R; 165/135; 181/204; 181/257
[58] Field of Search ............ 180/54 A, 69 C, 69 R, 180/68 P; 181/204, 211, 200, 205, 286, 257, 252; 165/135; 52/473; 98/2, 2.16, 121 R, 121 A

[56] References Cited

U.S. PATENT DOCUMENTS

| 1,323,978 | 12/1919 | Gebhardt | 98/121 R X |
| 1,865,677 | 7/1932 | Cheyney | 98/121 R X |
| 2,855,039 | 10/1958 | Gross | 181/287 X |
| 3,762,489 | 10/1973 | Proksch et al. | 180/69 R |
| 3,857,453 | 12/1974 | Buttke et al. | 180/54 A |
| 3,923,114 | 12/1975 | Suzuki | 180/54 A |
| 3,982,600 | 9/1976 | Gerresheim et al. | 180/69 C |

FOREIGN PATENT DOCUMENTS

| 50-77629 | 7/1975 | Japan. | |
| 196898 | 7/1938 | Switzerland | 52/473 |
| 1481854 | 8/1977 | United Kingdom. | |

Primary Examiner—Joseph F. Peters, Jr.
Assistant Examiner—Milton L. Smith
Attorney, Agent, or Firm—Phillips, Moore, Weissenberger, Lempio & Majestic

[57] ABSTRACT

An engine enclosure (10) has a noise suppression arrangement (15,15a,15b) mounted thereon including a plurality of acoustical energy absorbers (20,20a,20b) and sound reflectors (24,24a,24b) spaced from the absorbers to provide airflow passages (26,26a,26b) therebetween. The noise suppression arrangement (15,15a,15b) efficiently absorbs and reflects acoustical energy and exhibits a low space to sound absorption efficiency ratio in comparison to conventional noise suppression arrangements.

34 Claims, 5 Drawing Figures

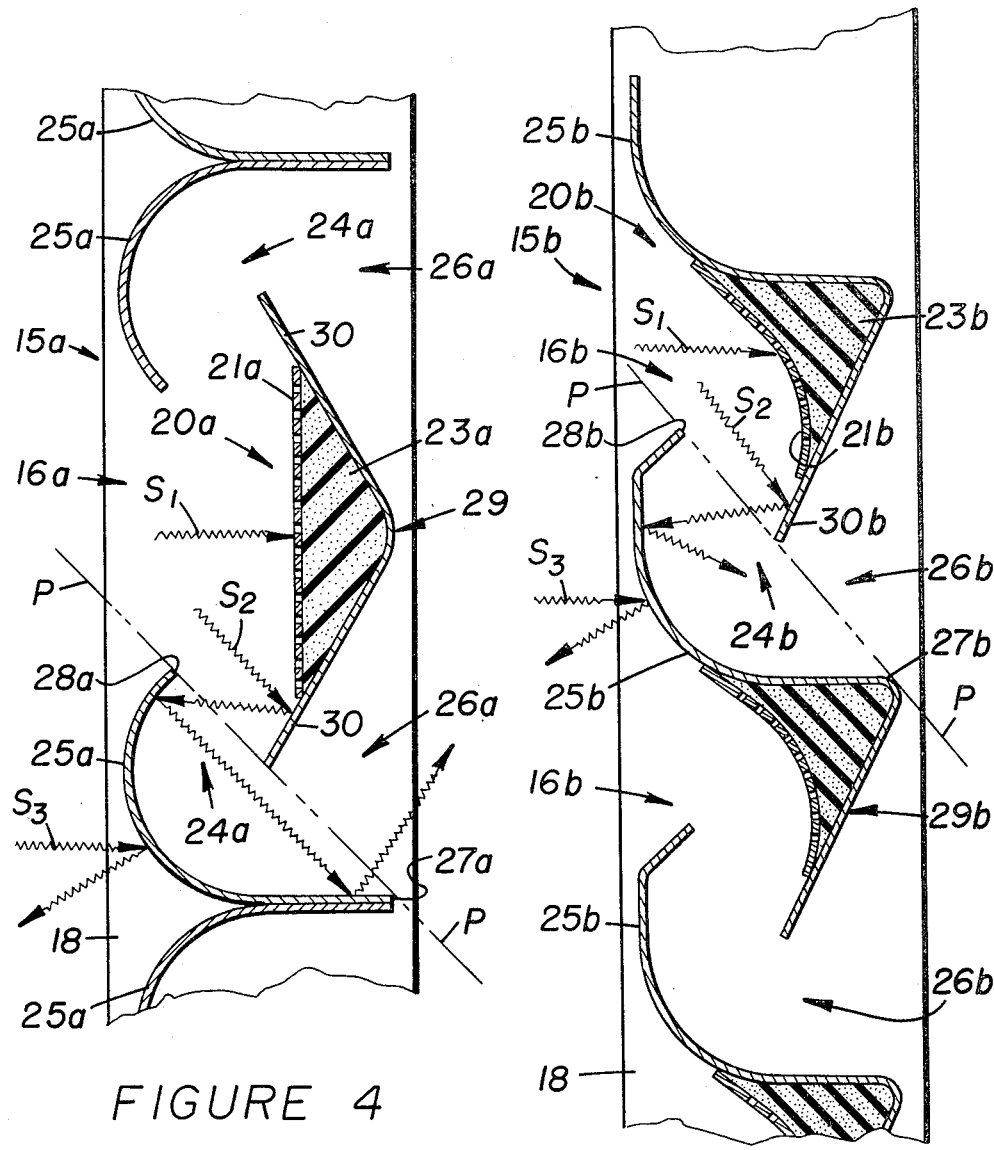

NOISE SUPPRESSION ARRANGEMENT FOR ENGINE ENCLOSURES

TECHNICAL FIELD

This invention relates to a noise suppresion arrangement adapted to be mounted on an engine enclosure of a vehicle for absorbing at least substantially all of the acoustical energy emanating therefrom.

BACKGROUND ART

Internal combustion engines and their accessories, such as an engine-driven cooling fan, emit an appreciable amount of noise or acoustical energy during operation thereof. Such energy is commonly measured by its level of intensity and its frequency range with the human being highly sensitive to frequencies in the range of from 800 Hz to 3,000 Hz. One approach to the dampening-down of the noise to an acceptable level is to provide the engine enclosure with a plurality of louvers mounted on one or more sides thereof with the louvers including acoustical material in the form of pads.

Although the louvers function efficiently to absorb a portion of the acoustical energy emitted from the engine, a substantial portion thereof is free to pass through airflow passages, necessarily defined between the louvers to permit ambient air to ingress into the engine enclosure for cooling purposes. In particular, the louvers are normally not constructed and arranged to be optically dense, when viewed from within the engine enclosure and only intercept and absorb a portion of the sound waves which represent the acoustical energy or noise.

In addition, conventional louver arrangements of the above type are somewhat bulky and exhibit relatively high space to sound absorption efficiency ratios.

DISCLOSURE OF INVENTION

The present invention is directed to overcoming one or more of the problems as set forth above.

In one aspect of this invention, an engine enclosure for a vehicle is provided with at least one noise suppression arrangement, including sound attenuating means for permitting the ingress of ambient air into the enclosure and for intercepting, reflecting, and absorbing at least substantially all of the sound waves emanating from within the enclosure by at least substantially providing an optically dense view from within the enclosure, exteriorly thereof.

The sound attenuating means includes a spaced plurality of acoustical energy absorption means for directly intercepting and absorbing a substantial portion of the sound waves and a plurality of separate sound reflecting means, each having ends positioned outwardly from and between each adjacent pair of sound absorption means, for providing an unobstructed passage to permit ambient airflow therethrough and to provide the above optically dense view to reflect and absorb at least substantially all of the remaining portions of the sound waves.

The sound attenuating means of this invention thus provides for the efficient absorption of acoustical energy and exhibits a compact and narrow profile adapting it for limited space requirements to provide a relatively low space to sound absorption efficiency ratio.

BRIEF DESCRIPTION OF THE DRAWINGS

Other objects of this invention will become apparent from the following description and accompanying drawings wherein:

FIG. 4 is a view similar to FIG. 3, but illustrates a second noise suppression arrangement embodiment of the present invention; and FIG. 5 is also a view similar to FIG. 3, but illustrates a third noise suppression arrangement embodiment of the present invention.

BEST MODE OF CARRYING OUT THE INVENTION

Figure 1:
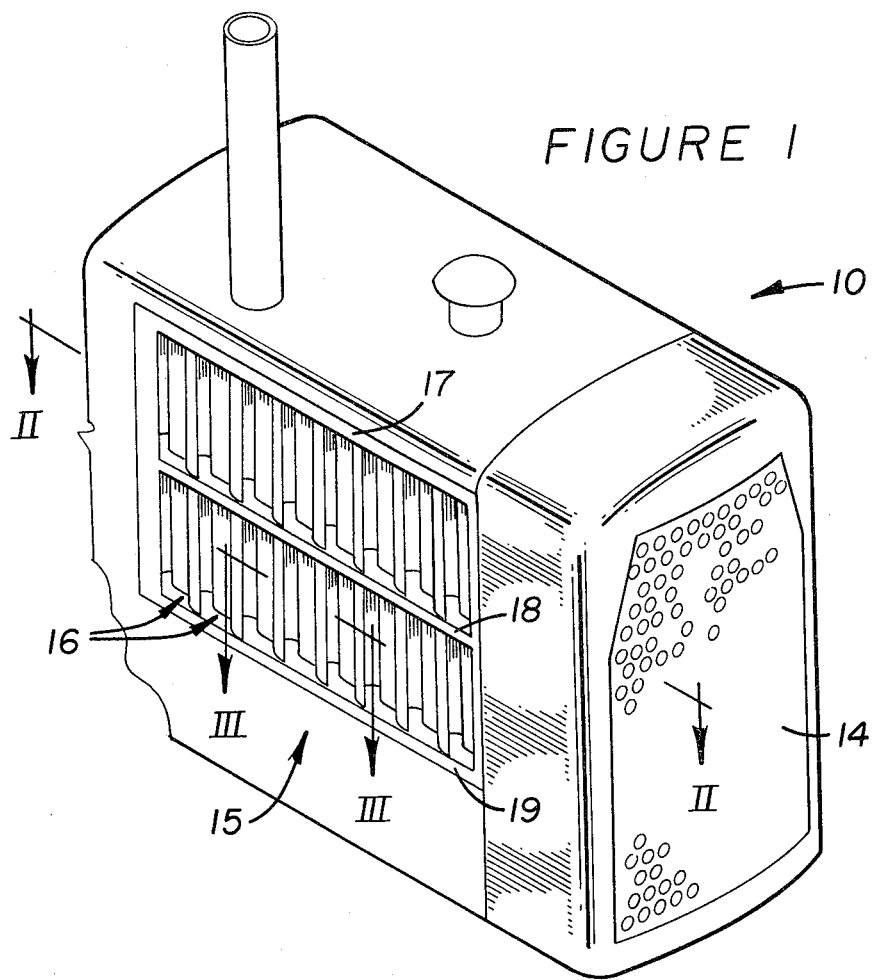
FIG. 1 is an isometric view illustrating an engine enclosure having a noise suppression arrangement embodiment of the present invention, mounted on either side thereof.
Figure 2:
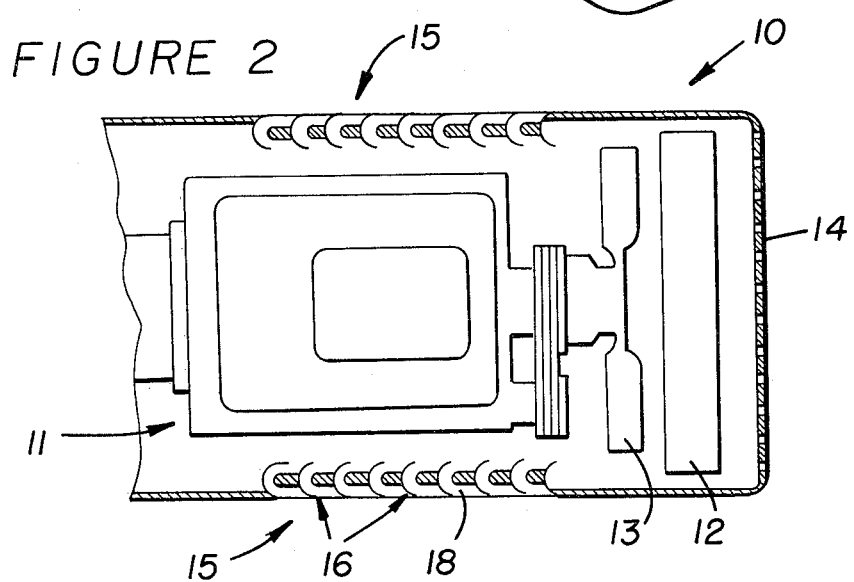
FIG. 2 is a sectional plan view, taken in the direction of arrows II—II in FIG. 1, illustrating the interior of the engine enclosure and the disposition of a noise suppression arrangement on either side thereof.

FIGS. 1 and 2 illustrate an engine enclosure 10, having an internal combustion engine 11 mounted therein. The engine is cooled in a conventional manner by a radiator 12 and an engine-driven fan 13, mounted forwardly of the engine and protected by a perforated guard 14. Ambient air is also communicated within engine enclosure 10 by a pair of noise suppression arrangements 15, mounted on either side of the engine enclosure.

As more clearly shown in FIG. 1, each noise suppression arrangement 15 comprises upper and lower sets of vertically disposed and longitudinally spaced louvers or sound attenuating means 16, secured between vertically spaced plates 17, 18 and 19. The structurally integrated noise suppression arrangements 15 may be integrally secured on respective sides of engine enclosure 10 or may be mounted on hinges (not shown) in a conventional manner to provide access to within the engine enclosure. As more fully discussed hereinafter, each noise suppression arrangement 15 permits the free ingress of ambient air into engine enclosure 10 and further functions to intercept and absorb acoustical energy emanating from within the engine enclosure.

Figure 3:
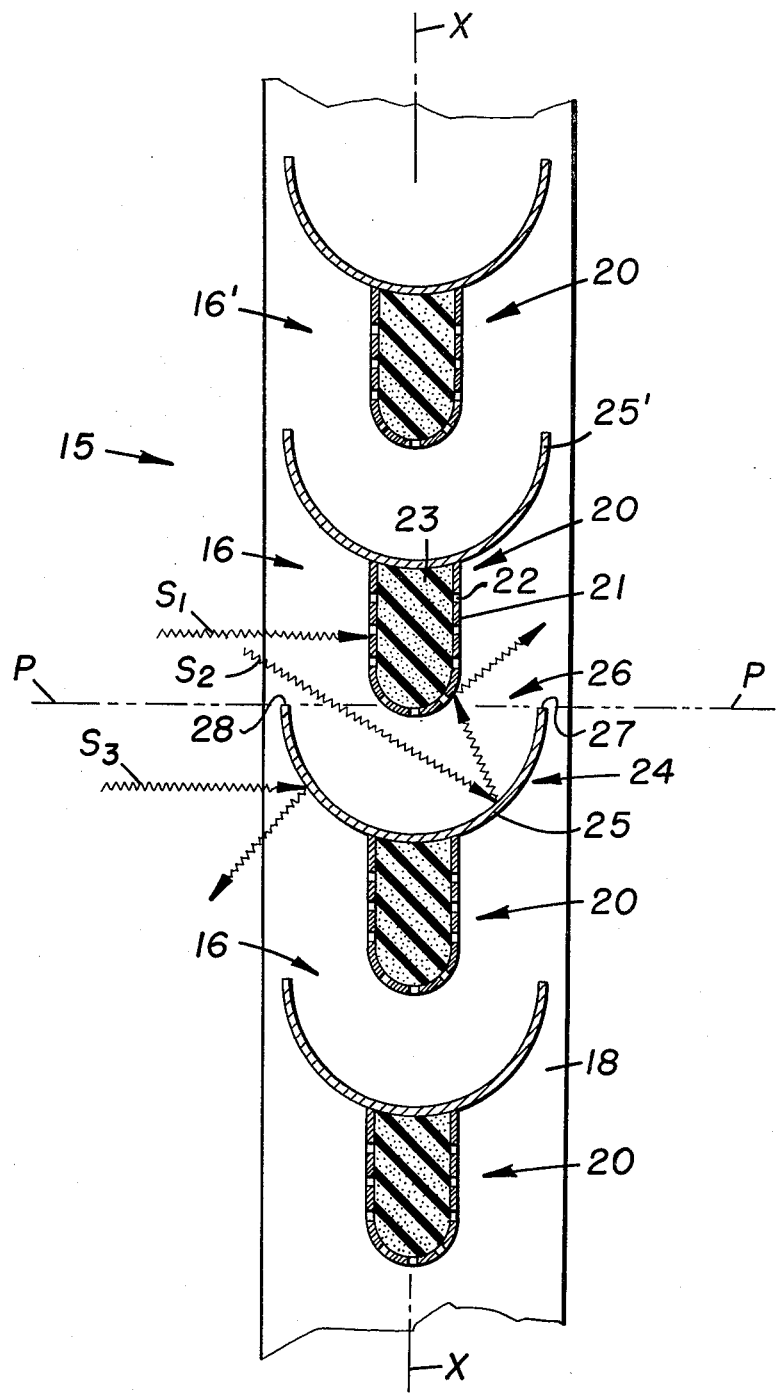
FIG. 3 is an enlarged, transverse sectional view through a portion of the noise suppression arrangement, taken in the direction of arrows III—III in FIG. 1.

Referring to FIG. 3, each sound attenuating means 16 comprises an acoustical energy absorption means 20, including a metal plate 21 of U-shaped cross section having a series of perforations 22 formed therethrough. In addition, a pad 23, composed of a standard acoustical material such as polyurethane foam, is suitably mounted within plate 21.

Each sound attenuating means 16 further comprises a reflecting means 24, shown in the form of an arcuate metal plate 25 which cooperates with a respective acoustical energy absorption means 20 to provide an unobstructed passage 26 to communicate ambient air to the engine compartment side of sound attenuating means 16. Reflecting means 24 further cooperates with sound absorption means 20 to provide an optically dense view from the engine compartment side, towards sound attenuating means 16, whereby sound waves are reflected and absorbed thereby.

In particular, a vertically disposed imaginary plane P intersects opposite ends 27 and 28 of plate 25, as well as absorption means 20. Otherwise stated, absorption means 20 and reflecting means 24 are disposed in nested relationship whereby they overlap each other to provide the optically dense relationship. In addition to providing unrestricted airflow through passages 26 and to efficiently intercept and absorb sound waves emitted from within engine compartment 10, each sound attenuating means 16 is compact to exhibit a narrow profile. Thus, the space to sound absorption efficiency ratio may be kept quite low in comparison to conventional noise suppression arrangements.

It should be noted in FIG. 3 that absorption means 20 are symmetrically disposed along with plates 25 relative to a longitudinal axis X of noise suppression arrangement 15. Also, plate 21 is secured on a convex side of a plate 25 of a next adjacent sound attenuating means 16' and faces a concave side of plate 25.

Referring again to FIG. 3, the intensities and frequencies of a substantial portion of sound waves emitted from the left or engine side of noise suppression arrangement 15 are dampened and absorbed by acoustical energy absorption means 20, as schematically depicted by sound wave $S_1$. It will be understood by those skilled in the art that sound wave $S_1$ is merely representative of the acoustical energy inherent with respect to the noise emanating from within enclosure 10 and that noise, in contrast to a musical sound, for example, has no single fundamental frequency with harmonic overtones, but rather consists of a series of random displacements with little semblance of regularity of any kind. Furthermore, the term sound or acoustical energy absorption is well known in the art to mean that such energy changes into another form, generally heat, when it contacts a solid body, such as energy absorption means 20 and, to a lesser extent, reflecting means 24.

As further depicted in FIG. 3, a sound wave $S_2$, which is not directly intercepted by absorption means 20, will be intercepted and deflected by plate 25 of sound reflecting means 24, to redirect the sound wave to absorption means 20. Certain other sound waves, $S_3$ may be deflected by plate 25 and egress to ambient directly, through passage 26, or deflect off the backside of plate 25 and back to engine compartment 10, without being intercepted by absorption means 20. As suggested above, even metal plates 21 and 25 will themselves absorb some of the acoustical energy.

FIG. 4 illustrates a second noise suppression arrangement embodiment 15a of this invention wherein identical numerals depict corresponding constructions, but with numerals appearing in FIG. 4 depicting modified constructions being accompanied by a subscript "a". Noise suppression arrangement 15a comprises a plurality of vertically disposed and horizontally spaced sound attenuating means 16a each including an acoustical absorption means 20a (one shown in FIG. 4) for directly absorbing a substantial portion of sound waves $S_1$ emitted from the left or engine side thereof. Acoustical energy absorption means 20a includes a perforated flat plate 21a, bonded or otherwise suitably secured to an acoustical pad 23a, along with a back-up plate 29 generally having a V-shaped cross section.

Sound attenuating means 16a further comprises sound reflecting means 24a, shown in the form of a pair of plates 25a each having an arcuate cross section. Sound reflecting means 24a may be considered to further comprise end extensions 30 of plate 29 which are positioned to provide an optically dense view from within engine enclosure 10. In particular, a plane P intersects ends 27a and 28a of each plate 25a and, further, at least approximately intersects a respective extension 30 of plate 29.

As depicted by sound wave $S_2$, some of the sound waves emanating within engine compartment 10 will miss acoustical energy absorption means 20a, but will be intercepted by extension 30 of plate 29 of sound reflecting means 24a. As further depicted by sound wave $S_3$, additional sound waves will be deflected by the backside of plate 25a and back into the engine enclosure. A portion of the sound waves which are thus reflected by only sound reflecting means 24a will be at least partially absorbed thereby to dissipate acoustical energy. It should be noted that each sound attenuating means 16a provides a pair of unobstructed airflow passages 26a therethrough.

FIG. 5 illustrates a third noise suppression arrangement embodiment 15b of the present invention wherein identical numerals depict corresponding constructions, but with numerals appearing in FIG. 5 depicting modified constructions being accompanied by a subscript "b". Noise suppression arrangement 15b comprises a plurality of vertically disposed and horizontally spaced sound attenuating means 16b, each including an acoustical energy absorption means 20b and a sound reflecting means 24b. Acoustical energy absorption means 20b includes a perforated plate 21b, having an arcuate cross section, bonded or otherwise suitably secured to an acoustical pad 23b, along with a backup plate 29b.

A sound reflecting means 24b comprises end extensions 25b and 30b of plate 29b and cooperates with sound absorption means 20b to provide an unobstructed airflow passage 26b therethrough and to further provide an optically dense view from within engine compartment 10. In particular, it should be noted in FIG. 5 that an imaginary vertical plane P will at least approximately intersect an apex portion 27b of plate 29b, an end 28b of extension 25b, and extension 30b. Therefore, a substantial portion of the sound waves, depicted by arrow $S_1$, will be directly absorbed by acoustical energy absorption means 20b, whereas a remaining portion of such sound waves, depicted by arrows $S_2$ and $S_3$, will be deflected and the energy thereof at least partially absorbed by sound reflecting means 24b.

INDUSTRIAL APPLICABILITY

Noise suppression arrangements 15, 15a, and 15b find particular application to the type of engine enclosure 10, illustrated in FIG. 1. Although the selected noise suppression arrangement is preferably disposed vertically on each lateral side of engine enclosure 10, it should be understood by those skilled in the arts relating hereto that such arrangement may be otherwise disposed, such as horizontally and on the bottom, top and/or front side of the engine enclosure. Furthermore, the noise suppression arrangement will find other applications, in addition to those associated with engine compartment 10, wherein the provision of a sound barrier is desired to jacket-in acoustical energy to reduce ambient noises to an acceptable level.

Referring to FIGS. 3-5, substantial portions of the sound waves will be absorbed directly by the respective acoustical energy absorption means 20, 20a, and 20b, as depicted by arrows $S_1$. Remaining portions of the sound waves, as depicted by arrows $S_2$ and $S_3$, which do not contact the acoustical energy absorption means directly will be deflected and the energy thereof at least partially dissipated to further lower the overall noise level.

As illustrated by arrow $S_2$ in FIG. 3, some of the latter sound waves will, in fact, be reflected back to acoustical energy absorption means 20. Other sound waves, as depicted by arrows $S_3$ in FIGS. 3-5, will deflect back into engine enclosure 10 (FIG. 2) wherein they will be further dissipated.

The above-described noise suppression arrangement 15, 15a, and 15b will thus provide for the free ingress of airflow into engine compartment 10 via passages 26, 26a, and 26b while yet providing for a substantial attenuation of the noise emanating therefrom. In addition, the absorption means (20,20a,20b) and sound reflecting means (24,24a,24b) will provide for the compact nesting thereof together whereby the respective noise suppression arrangements will exhibit a compact and narrow profile, as exemplified by noise suppression arrangement 15 in FIG. 2. Thus, the space to sound absorption efficiency ratio thereof is substantially low relative to conventional noise suppression arrangements.

Other aspects, objects, and advantages of this invention can be obtained from the study of the drawings, the disclosure, and the appended claims.

I claim:

1. In a vehicle of the type comprising an engine enclosure (10) having a noise suppression arrangement (15,15a,15b) mounted thereon, the improvement comprising said noise suppression arrangement (15,15a,15b) including sound attenuating means (16,16a,16b) for permitting the free ingress of ambient air into said enclosure (10) and for intercepting, reflecting and absorbing at least substantially all of the sound waves (S) emanating from within said enclosure (10) by at least substantially providing an optically dense view from within said enclosure (10) to exteriorly thereof, said sound attenuating means (16,16a,16b) including a spaced plurality of acoustical energy absorption means (20,20a,20b) for directly absorbing a substantial portion of said sound waves ($S_1$), and a plurality of separate sound reflecting means (24,24a,24b), cooperating with and each having ends positioned outwardly from and between each adjacent spaced pair of said sound absorption means (20,20a,20b), for providing an unobstructed passage (26,26a,26b) to permit the flow of said ambient air therethrough and for reflecting and absorbing at least substantially all of the remaining portions of said sound waves ($S_2,S_3$), each said acoustical energy absorption means (20,20a,20b) and each adjacent said reflecting means (24,24a,24b) being spaced and disposed in nested and overlapped relationship relative to each other so that an imaginary plane (P) at least approximately intersects each of said acoustical energy absorption means (20,20a,20b) and each adjacent said sound reflecting means (24,24a,24b), the outwardly positioned ends of each said reflecting means (24,24a,24b) being spaced outwardly from a respective one of said acoustical energy absorption means (20,20a,20b) both in the direction of said plane (P) and transversely thereof.

2. The vehicle of claim 1 wherein said acoustical energy absorption means (20,20a,20b) includes an acoustical pad (23,23a,23b) and a perforated plate (21,21a,21b) mounted on said pad (23,23a,23b).

3. The vehicle of claim 2 wherein perforated plate (21) has a U-shaped cross section and wherein said acoustical pad (23) is disposed within said plate.

4. The vehicle of claim 2 including a plurality of said sound attenuating means (16) and wherein a said plate (21) of one of said sound attenuating means (16) is secured to the sound reflecting means (24) of a next adjacent sound attenuating means (16).

5. The vehicle of claim 4 wherein said sound reflecting means (24) includes a plate (25) having an arcuate cross section and wherein the plates (21,25) of said sound attenuating means (16) are disposed in symmetrical relationship relative to a longitudinal axis (X) of said noise suppression arrangement (15).

6. The vehicle of claim 5 wherein the plate (25) of said sound reflecting means (24) has ends (27,28) disposed on either side of said acoustical energy absorption means (20) and wherein an imaginary plane (P) at least approximately intersects said ends (27,28) and said acoustical energy absorption means.

7. The vehicle of claim 1 wherein a plurality of said sound attenuating means (16,16a,16b) are mounted on a side of said enclosure (10) and wherein said sound reflecting means (24,24a,24b) includes at least one plate (25,25a,25b).

8. The vehicle of claim 7 wherein the plates (25) of said plurality of sound reflecting means (24) are disposed in symmetrical relationship along a longitudinal axis (X) of said noise suppression arrangement (15) with each of said plates (25) having an arcuate cross section.

9. The vehicle of claim 8 wherein the acoustical energy absorption means (20) of one of said sound attenuating means (16) faces a concave side of the plate (25) of said one of said sound attenuating means (16) and is secured on a convex side of a plate (25) of a next adjacent sound attenuating means (16').

10. The vehicle of claim 7 wherein an imaginary plane (P) at least approximately intersects ends (27,28) of the plate (25) of said sound reflecting means (24) and said acoustical energy absorption means (20).

11. The vehicle of claim 7 wherein said sound reflecting means (24) includes a pair of longitudinally spaced plates (25a) having ends thereof disposed in at least approximate overlapping relationship relative to said acoustical energy absorption means (20a), as viewed in the direction of a longitudinal axis (X) of said noise suppression arrangement (15).

12. The vehicle of claim 11 wherein said acoustical energy absorption means (20a) includes an acoustical pad (23a) having a perforated plate (21a) mounted thereon to face towards said engine enclosure (10).

13. The vehicle of claim 12 wherein said acoustical pad (23a) is mounted on a back-up plate (29) having each end (30) thereof extending past said acoustical pad (23a) and said perforated plate (21a) in the direction of said longitudinal axis (X) to further overlap an end (28a) of a respective one of the plates (25a) of said sound reflecting means (24a).

14. The vehicle of claim 7 wherein said plate (25b) overlaps only one end of said acoustical energy absorption means (20b) and is disposed in unsymmetrical relationship therewith, as viewed in the direction of a longitudinal axis (X) of said noise suppression arrangement (15b).

15. The vehicle of claim 14 further including a back-up plate (29b) having a next adjacent one of said acoustical energy absorption means (20b) secured thereon and wherein the plate (25b) of said sound deflecting means (24b) forms an extension of said back-up plate (29b).

16. The vehicle of claim 15 wherein said back-up plate (29b) has an extension (30b) thereof disposed opposite to the plate (25b) of said sound deflecting means (24b).

17. The vehicle of claim 15 wherein said acoustical energy absorption means (20b) includes an acoustical pad (23b) mounted on said back-up plate (29b) and a perforated plate (21b), having an arcuate cross section, mounted on said acoustical pad (23b).

18. A noise suppression arrangement (15,15a,15b) having first and second sides comprising
a spaced plurality of acoustical energy absorption means (20,20a,20b) for directly intercepting and absorbing a substantial portion of sound waves ($S_1$) emitted from said first side and directed toward said second side, and
a plurality of separate sound reflecting means (24,24a,24b), cooperating with and each having ends positioned outwardly from and between each adjacent spaced pair of said acoustical energy absorption means (20,20a,20b), for providing an unobstructed opening (26,26a,26b) to permit unrestricted airflow from said second side to said first side and to at least substantially provide an optically dense view of said second side from said first side and to reflect and absorb at least substantially all of the remaining portions of said sound waves ($S_2,S_3$), each said acoustical energy absorption means (20,20a,20b) and an adjacent one of said reflecting means (24,24a,24b) being disposed in spaced, nested and overlapped relationship relative to each other so that an imaginary plane (P) at least approximately intersects each of said acoustical energy absorption means (20,20a,20b) and said sound reflecting means (24,24a,24b), the outwardly positioned ends of each said reflecting means (24,24a,24b) being spaced outwardly from a respective one of said acoustical energy absorption means (20,20a,20b) both in the direction of said plane (P) and transversely thereof.

19. The noise suppression arrangement of claim 18 wherein said acoustical energy absorption means (20,20a,20b) includes an acoustical pad (23,23a,23b) and a perforated plate (21,21a,21b) mounted on said pad (23,23a,23b).

20. The noise suppression arrangement of claim 19 wherein said perforated plate (21) has a U-shaped cross section and wherein said acoustical pad (23) is disposed within said plate.

21. The noise suppression arrangement of claim 19 including a plurality of said sound attenuating means (16) and wherein a said plate (21) of one of said sound attenuating means (16) is secured to the sound reflecting means (24) of a next adjacent sound attenuating means (16).

22. The noise suppression arrangement of claim 21 wherein said sound reflecting means (24) includes a plate (25) having an arcuate cross section and wherein the plates (21,25) of said sound attenuating means (16) are disposed in symmetrical relationship relative to a longitudinal axis (X) of said noise suppression arrangement (15).

23. The noise suppression arrangement of claim 22 wherein the plate (25) of said sound reflecting means (24) has ends (27,28) disposed on either side of said acoustical energy absorption means (20) and wherein an imaginary plate (P) at least approximately intersects said edges (27,28) and said acoustical energy absorption means.

24. The noise suppression arrangement of claim 18 including a plurality of said sound attenuating means (16,16a,16b) and wherein said sound reflecting means (24,24a,24b) includes at least one plate (25,25a,25b).

25. The noise suppression arrangement of claim 24 wherein the plates (25) of said plurality of sound reflecting means (24) are disposed in symmetrical relationship along a longitudinal axis (X) of said noise suppression arrangement (15) with each of said plates (25) having an arcuate cross section.

26. The noise suppression arrangement of claim 25 wherein the acoustical energy absorption means (20) of one of said sound attenuating means (16) faces a concave side of the plate (25) of said one of said sound attenuating means (16) and is secured on a convex side of a plate (25) of a next adjacent sound attenuating means (16').

27. The noise suppression arrangement of claim 24 wherein an imaginary plane (P) at least approximately intersects ends (27,28) of the plate (25) of said sound reflecting means (24) and said acoustical energy absorption means (20).

28. The noise suppression arrangement of claim 24 wherein said sound reflecting means (24) includes a pair of longitudinally spaced plates (25a) having ends thereof disposed in at least approximate overlapping relationship relative to said acoustical energy absorption means (20a), as viewed in the direction of a longitudinal axis (X) of said noise suppression arrangement (15).

29. The noise suppression arrangement of claim 28 wherein said acoustical energy absorption means (20a) includes an acoustical pad (23a) having a perforated plate (21a) mounted thereon.

30. The noise suppression arrangement of claim 29 wherein said acoustical pad (23a) is mounted on a back-up plate (29) having each end (30) thereof extending past said acoustical pad (23a) and said perforated plate (21a) in the direction of said longitudinal axis (X) to further overlap an end (28a) of a respective one of the plates (25a) of said sound reflecting means (24a).

31. The noise suppression arrangement of claim 24 wherein said plate (25b) overlaps only one end of said acoustical energy absorption means (20b) and is disposed in unsymmetrical relationship therewith, as viewed in the direction of a longitudinal axis (X) of said noise suppression arrangement (15b).

32. The noise suppression arrangement of claim 31 further including a back-up plate (29b) having a next adjacent one of said acoustical energy absorption means (20b) secured thereon and wherein the plate (25b) of said sound deflecting means (24b) forms an extension of said back-up plate (29b).

33. The noise suppression arrangement of claim 32 wherein said back-up plate (29b) has an extension (30b) thereof disposed opposite to the plate (25b) of said sound deflecting means (24b).

34. The noise suppression arrangement of claim 32 wherein said acoustical energy absorption means (20b) includes an acoustical pad (23b) mounted on said back-up plate (29b) and a perforated plate (21b), having an arcuate cross section, mounted on said acoustical pad (23b).

* * * * *